US009552387B2

(12) United States Patent
Foebel et al.

(10) Patent No.: US 9,552,387 B2
(45) Date of Patent: *Jan. 24, 2017

(54) SECURITY FOR DEBUGGING OF DATABASE SESSIONS

(71) Applicants: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Sascha Zorn, Schwetzingen (DE)

(72) Inventors: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Sascha Zorn, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/315,608

(22) Filed: Jun. 26, 2014

(65) Prior Publication Data
US 2015/0150094 A1 May 28, 2015

Related U.S. Application Data

(60) Provisional application No. 61/908,710, filed on Nov. 25, 2013.

(51) Int. Cl.
*H01L 29/06* (2006.01)
*G06F 17/30* (2006.01)
(Continued)

(52) U.S. Cl.
CPC ..... *G06F 17/30371* (2013.01); *G06F 11/3668* (2013.01); *G06F 17/30289* (2013.01);
(Continued)

(58) Field of Classification Search
CPC ............................. H04L 63/08; G06F 21/6218
See application file for complete search history.

(56) References Cited

U.S. PATENT DOCUMENTS 8,752,017 B2 * 6/2014 Hossain et al. ............... 717/124
8,850,219 B2 * 9/2014 Dapkus ................. G06F 21/577
713/185

(Continued)

*Primary Examiner* — Ali Abyaneh
*Assistant Examiner* — Shaqueal Wade
(74) *Attorney, Agent, or Firm* — Buckley, Maschoff & Talwalkar, LLC

(57) ABSTRACT

A system includes reception of authorization information associated with one or more database server sessions of a first user, the authorization information associating the first user, a second user, and an authorization period, establishment of a first database server session of the first user, establishment of a second database server session of the second user, reception, from the second user, of a request to debug the first database server session, determination, based on the authorization information, that the second user is authorized to debug the first database server session, and, in response to the determination, attachment of the second database server session to the first database server session, and transmission of debugging information of the first database server session to the second user.

18 Claims, 10 Drawing Sheets

(51) Int. Cl.
    *H04L 12/26*     (2006.01)
    *G06F 11/36*     (2006.01)
    *H04L 29/08*     (2006.01)
    *G06F 21/62*     (2013.01)
    *H04L 29/06*     (2006.01)

(52) U.S. Cl.
    CPC .. *G06F 17/30303* (2013.01); *G06F 17/30864* (2013.01); *H04L 43/10* (2013.01); *H04L 63/083* (2013.01); *H04L 67/02* (2013.01); *G06F 21/6218* (2013.01); *H04L 63/08* (2013.01)

(56) References Cited

U.S. PATENT DOCUMENTS

| | | | | |
|---|---|---|---|---|
| 2006/0184535 | A1* | 8/2006 | Kaluskar | G06F 17/30289 |
| 2010/0318570 | A1* | 12/2010 | Narasinghanallur | G06F 17/30289 |
| | | | | 707/783 |
| 2012/0317443 | A1* | 12/2012 | Chandran | G06F 11/3664 |
| | | | | 714/38.1 |
| 2013/0305030 | A1* | 11/2013 | Chen | G06F 11/261 |
| | | | | 713/100 |
| 2014/0095428 | A1* | 4/2014 | Beresniewicz | G06F 17/30306 |
| | | | | 707/609 |

\* cited by examiner

SECURITY FOR DEBUGGING OF DATABASE SESSIONS

CROSS REFERENCE TO RELATED APPLICATIONS

This application claims benefit to and priority of U.S. Patent Application Ser. No. 61/908,710, filed Nov. 25, 2013, the contents of which are hereby incorporated by reference in their entirety for all purposes.

BACKGROUND

According to conventional database architectures, a client application interacts with a database application executing on a database application server. In response to requests received from the client application, the database application acquires stored data from an underlying database system, performs any necessary processing, and provides the data to the client application.

Development of a database application typically requires some degree of debugging activity. It may be beneficial to allow a second user to debug a database server session of a first user. Efficient systems are desired for authorizing such debugging and for determining whether the debugging is authorized.

DETAILED DESCRIPTION

The following description is provided to enable any person in the art to make and use the described embodiments and sets forth the best mode contemplated for carrying out some embodiments. Various modifications, however, will remain readily apparent to those in the art.

Some embodiments support debugging of database server sessions. More particularly, some embodiments may provide authorization for debugging database server-side application program code (e.g., JavaScript code) in the context of an existing database server session.

Figure 1:
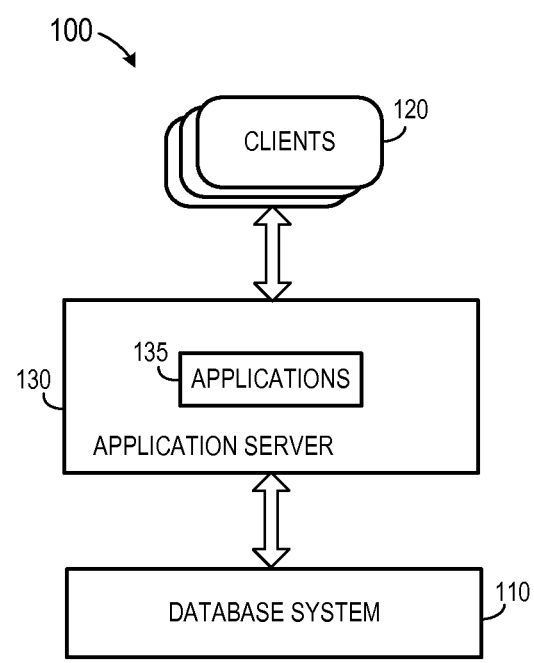
FIG. 1 is a block diagram of a system according to some embodiments.

FIG. 1 is a block diagram of system 100 according to some embodiments. System 100 includes database system 110, clients 120, and application server 130. Generally, application server 130 receives queries from clients 120 and provides results to clients 120 based on data of database system 110. Database system 110 and application server 130 may support multi-tenancy to separately support multiple unrelated clients by providing multiple logical database systems which are programmatically isolated from one another.

Database system 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, the full database may be stored in one or more fixed disks (e.g., persistent memory for storing their respective portions of the full database) and accessed during operation when needed.

Database system 110 may comprise any query-responsive data source or sources that are or become known, including but not limited to a structured-query language (SQL) relational database management system. Database system 110 may comprise a relational database, a multi-dimensional database, an eXtendable Markup Language (XML) document, or any other data storage system storing structured and/or unstructured data. Database system 110 may be distributed among several relational databases, dimensional databases, and/or other data sources. Embodiments are not limited to any number or types of data sources.

In some embodiments, data of database system 110 may comprise one or more of conventional tabular data, row-based data, column-based data, and object-based data. Moreover, the data of database system 110 may be indexed and/or selectively replicated in an index to allow fast searching and retrieval thereof.

Application server 130 generally provides data of database system 110 to reporting/analysis clients, such as clients 120, in response to queries received therefrom. In some embodiments, application server 130 receives an instruction from a client 120 to analyze a set of values, such as the values stored in a column of a database table. Application server 130 generates a statement execution plan based on the instruction and the plan is forwarded to database system 110, which executes the plan and returns a dataset based on the plan. Application server 130 then returns the dataset to the client 120. Embodiments are not limited thereto.

Application server 130 includes any suitable interfaces through which clients 120 may communicate with applications 135 executing on application server 130. For example, application server 130 may include a HyperText Transfer Protocol (HTTP) interface supporting a transient request/response protocol over Transmission Control Protocol (TCP), and/or a WebSocket interface supporting non-transient full-duplex communications between application server 130 and any clients 120 which implement the WebSocket protocol over a single TCP connection.

Application server 130 may be separated from or closely integrated with database system 110. A closely-integrated application server 130 may enable execution of server applications completely on the database platform, without the need for an additional application server.

Each of clients 120 may comprise one or more devices executing program code of a software application for presenting user interfaces to allow interaction with application server 130. The user interfaces may comprise user interfaces suited for reporting, data analysis, and/or any other functions based on the data of database system 110. The user interfaces may also or alternatively comprise interfaces for administration of application server 130, database system 110 and/or applications 135 of application server 130. For example, one or more of clients 120 may provide a user interface to provide authorization information as described below. Moreover, one of clients 120 may present a user interface using which an administrator may attach to an existing server session and debug program code of one of applications 135.

Presentation of a user interface may comprise any degree or type of rendering, depending on the type of user interface code generated by application server 130. For example, a client 120 may execute a Web Browser to request and receive a Web page (e.g., in HTML format) from application server 130 via HTTP, HTTPS, and/or WebSocket, and may render and present the Web page according to known protocols. One or more of clients 120 may also or alternatively present user interfaces by executing a standalone executable file (e.g., an .exe file) or code (e.g., a JAVA applet) within a virtual machine.

Figure 2A:
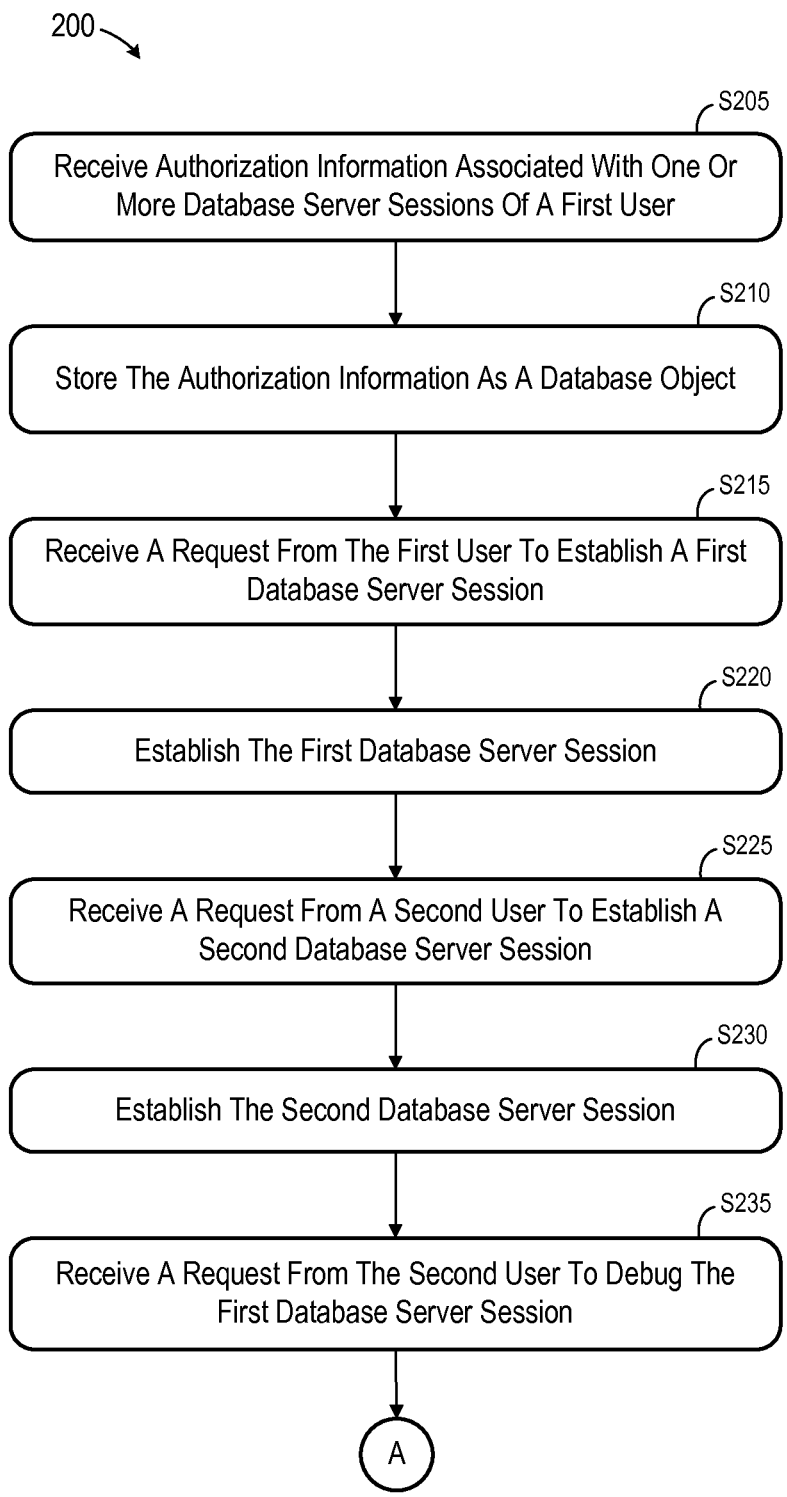
FIGS. 2A and 2B comprise a flow diagram of a process according to some embodiments.
Figure 2B:
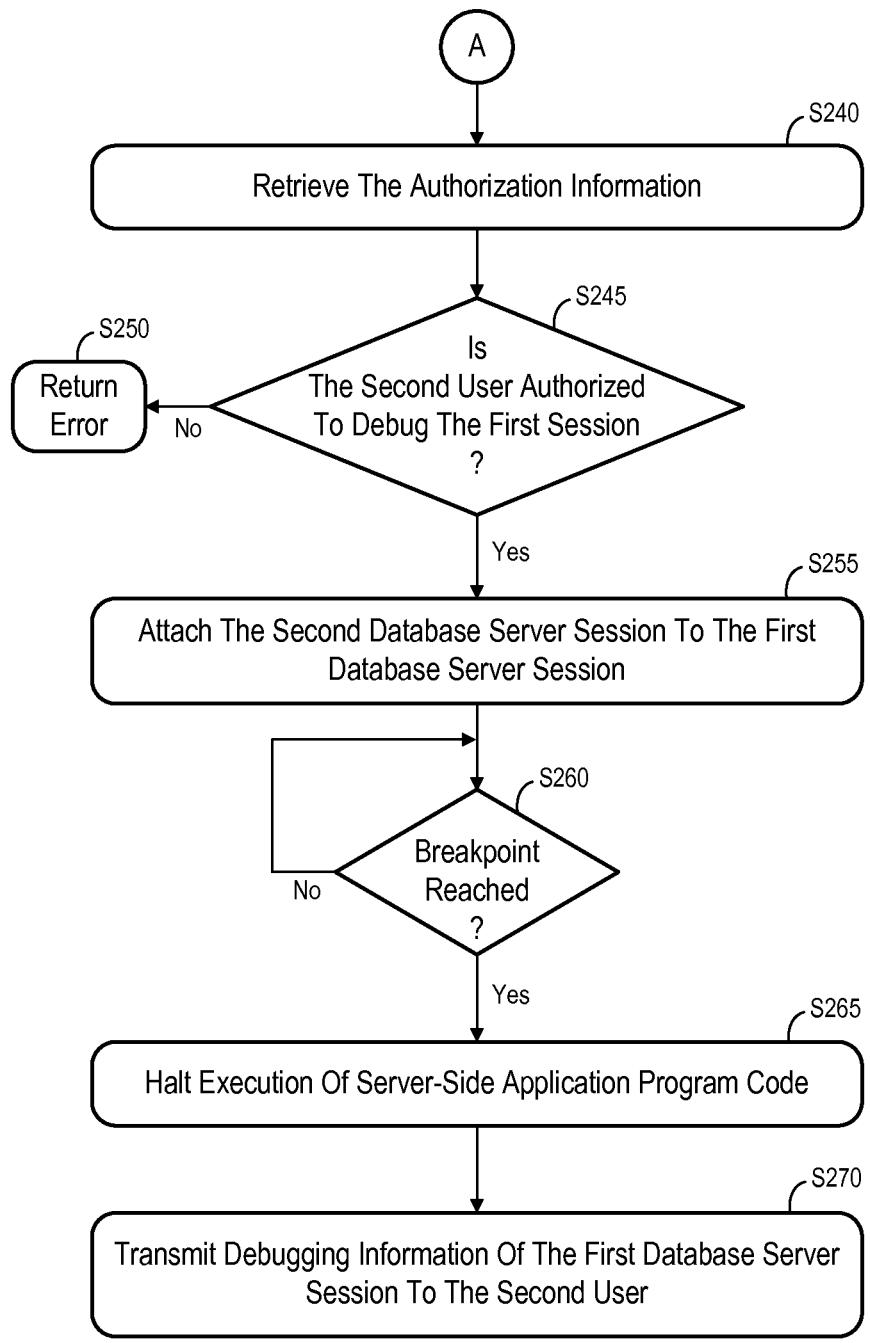

FIGS. 2A and 2B comprise a flow diagram of process 200 according to some embodiments. In some embodiments, various hardware elements of application server 130 (e.g., one or more processors) execute program code to perform process 200. Process 200 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S205, authorization information associated with one or more database sessions of a first user is received. The authorization information may be received at design time and/or at runtime according to some embodiments. In some embodiments, the authorization information identifies the first user, one or more second users, and one or more sessions of the first user. The authorization information may also specify time constraints of the authorization (e.g., a start time and an end time) and/or any other suitable information.

Figure 3:
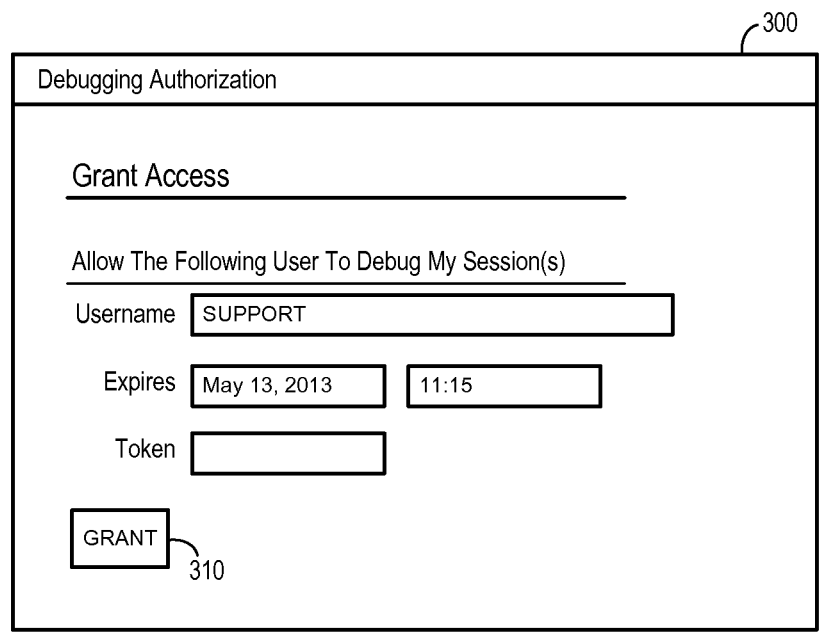
FIG. 3 is an outward view of a user interface according to some embodiments.

FIG. 3 is an outward view of interface 300 through which authorization information may be received according to some embodiments of S205. Interface 300 includes input fields for specifying a Username of a second user who is authorized to debug one or more sessions of the first user, an expiration date/time, and an optional token. If a token is specified, the authorization applies only to sessions of the first user which are flagged with the token. If a token is not specified, the authorization applies to all sessions of the first user. Accordingly, the first user is provided with the token in order to allow the first user to pass the token (if desired) to application server 130 when requesting a database server session.

Interface 300 may be presented at runtime or design time, on any computing device in communication with application server 130. Interface 300 may be populated by a database administrator, by a first user, or by any other user permitted to authorize debugging of the first user's database sessions. Embodiments are not limited to the appearance and/or functionality of interface 300.

Figure 4:
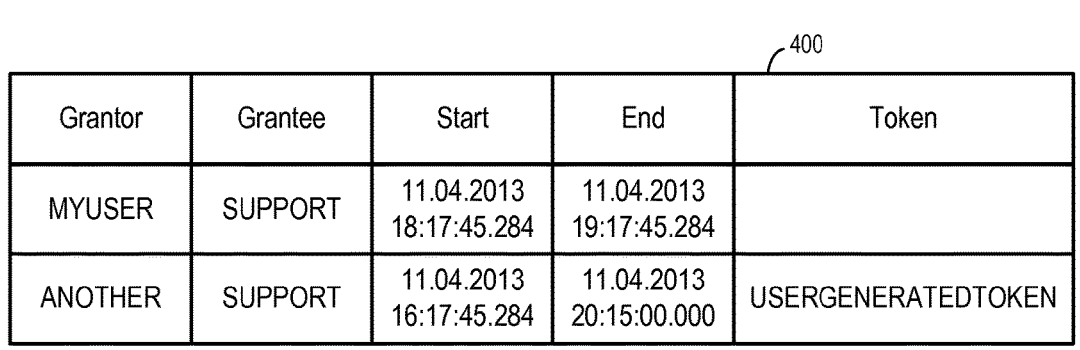
FIG. 4 illustrates a portion of a database table according to some embodiments.

The authorization information is stored at S210 in response to selection of Grant icon 310. According to some embodiments, storage of the authorization information includes storing data associated with the authorization as a metadata object within a metadata repository of application server 130. FIG. 4 depicts an example of a repository table according to some embodiments. Debug authorization table 400 specifies, for each authorization stored therein, a Grantor, a Grantee, a Start time, an End time, and an optional Token.

A request to establish a first database server session is received from the first user at S215. The request may be received well after storage of the authorization information at S210. More specifically, any number of intervening events may occur between S210 and S215, and these processes are only temporally related in that S215 occurs after S210 in some embodiments.

FIG. 4 is a sequence diagram illustrating execution of S215 through S270 of process 200 according to some embodiments. As shown, client 120' transmits a request to application server 130 at S210. The request is an HTTP request according to some embodiments.

Figure 5:
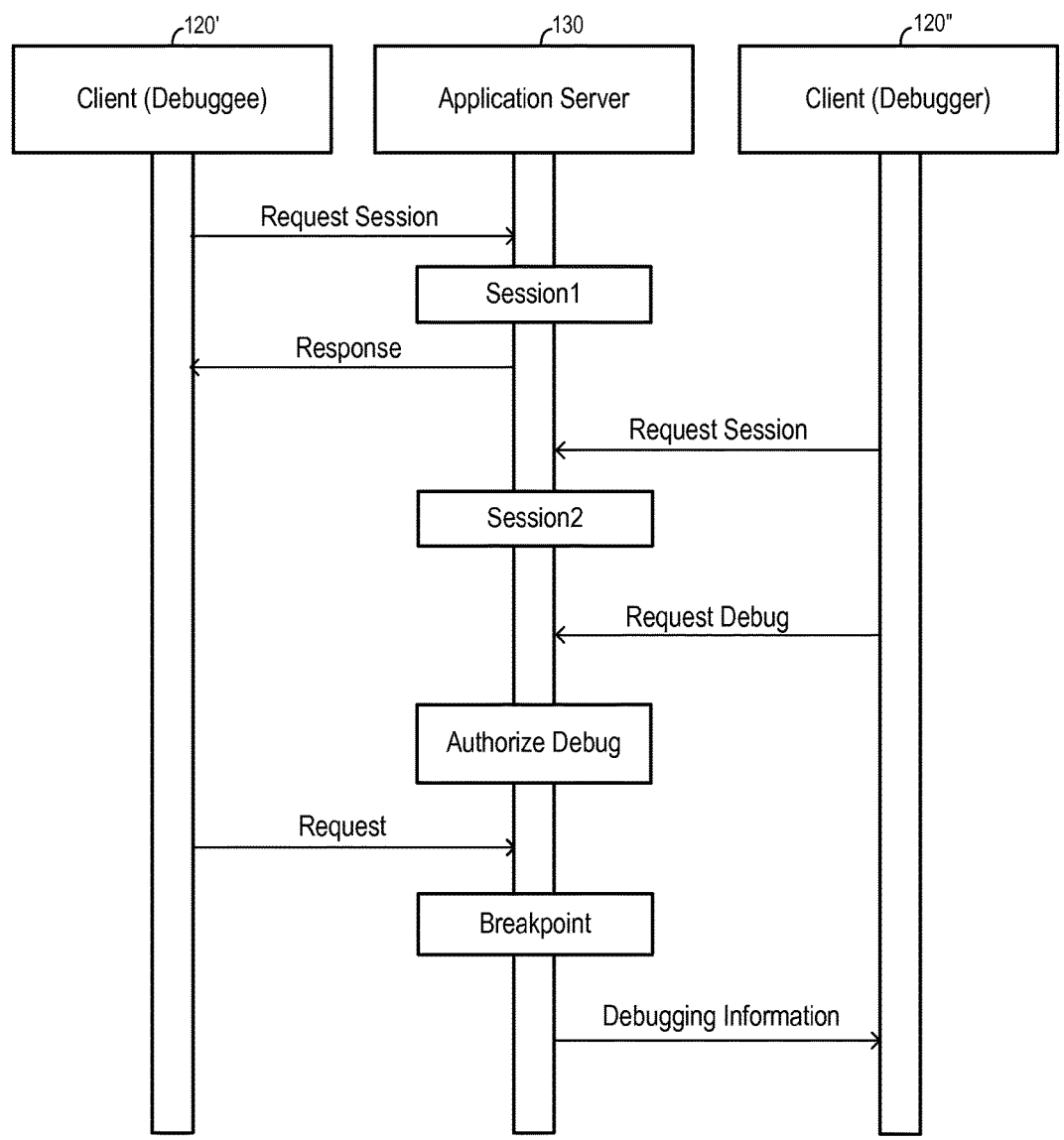
FIG. 5 is a sequence diagram according to some embodiments.

The first database server session is established with the first user at S220. FIG. 5 illustrates establishment of Session1 at application server 130. In this regard, a token as described above may be received from the first user within an internet cookie along with the request of S215, which results in association of the token with first database server session. FIG. 5 also illustrates transmission of a response from application server 130 to client 120'. Such a response conforms to a request/response protocol such as HTTP, but embodiments are not limited thereto.

A request is received from a second user at S225. The request is a request to establish a second database server session. According to some embodiments, a WebSocket client application of client 120" transmits the request, which is received at S225 by a WebSocket interface of application server 130. A WebSocket request would cause application server 130 to establish and maintain a non-transitory, full-duplex connection with client 120". Embodiments are not limited to the WebSocket protocol.

The second database server session is established at S230 in response to the request. The second database server session is identified as Session2 in FIG. 5.

Next, at S235, a request is received from the second user to debug the first database server session. In response, the authorization information is retrieved at S240. Retrieval of the authorization information may comprise requesting authorization information database objects (i.e., rows of table 400) associated with the first user from a metadata repository of application server 130. The metadata repository may be stored in database system 110; therefore the request may comprise a request from application server 130 to database system 110.

Based on the authorization information, it is then determined at S245 whether the second user is authorized to debug the first database server session. The determination may comprise determining whether any of the retrieved authorization information database objects include the second user as Grantee and also specify a Start time and an End time which encompass the current time. If such an object is found, it is determined whether the object also specifies a token. If the object does not specify a token, it is determined that the second user is authorized to debug the first database server session. If the object specifies a token, the determination at S245 turns on whether the specified token was received from client 120' with the request of S215.

An error is returned to the second user at S250 if it is determined that the second user is not authorized to debug to the first session. If it is determined that the second user is authorized to debug the first session, the second database server session is attached to the first database server session at S255. Once the sessions are attached, the second database server session inherits all relevant states of the first database server session.

Next, as illustrated in FIG. 5, a second request may be received from the first user (e.g., client 120'). The second request causes execution of server-side application program code of an application 135. According to some embodiments, the server-side application 135 may have already been executing in server 130 prior to S255, but the received request prompts execution of the server-side application program code which includes a pre-defined breakpoint.

In this regard, a breakpoint may be defined in server-side application program code. The program code may conform to C++, COBOL, Visual Basic, JavaScript, or another programming language that is or becomes known. A breakpoint is a point in program code at which execution of the program code stops. A breakpoint is useful in debugging because, after execution is stopped at the breakpoint, a debugger may inspect values of variables and application states as they existed at the stoppage point.

Figure 6:
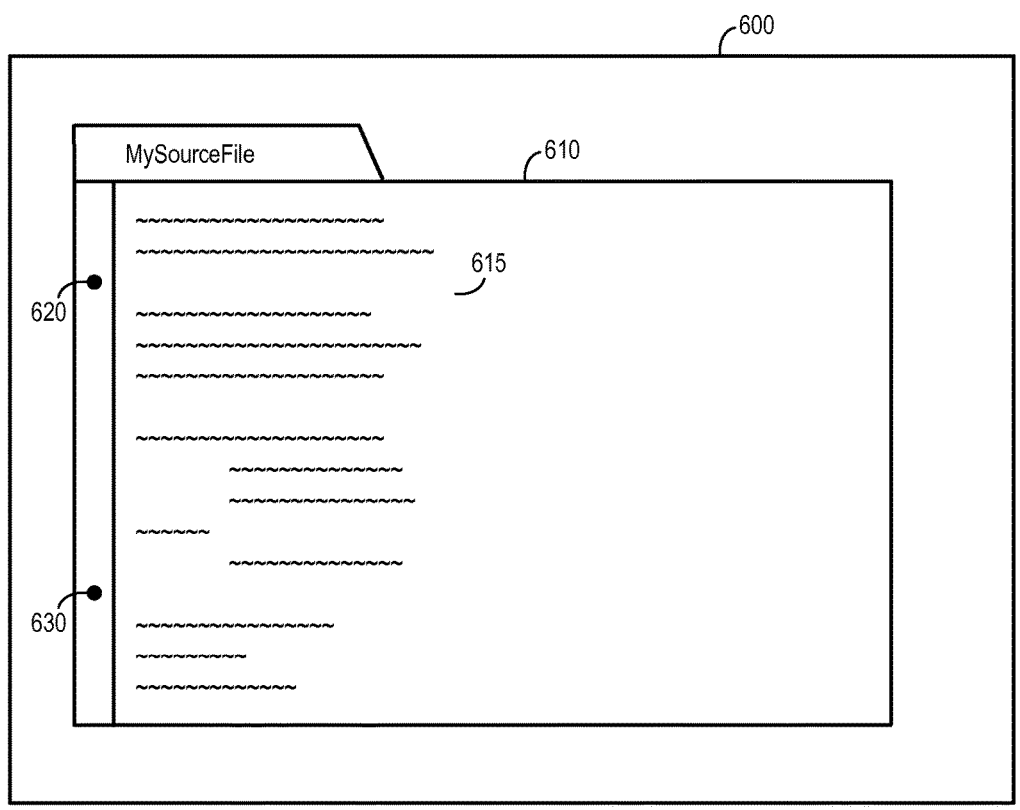
FIG. 6 is an outward view of a user interface according to some embodiments.

FIG. 6 is an outward view of an interface for defining a breakpoint according to some embodiments. Programming environment 600 may comprise an interface provided by a programming application, toolkit or the like executing on a computing system. Window 610 displays server-side application program code 615. As shown, a developer has operated an input device of the computing system to define breakpoints 620 and 630 within program code 615.

In the case of multiple breakpoints such as breakpoints 620 and 630, execution of the application stops when breakpoint 620 is reached. A debugger performs any desired debugging activity and then issues a command to resume execution of the application. Execution resumes and then stops again when breakpoint 630 is reached. Embodiments are not limited to the interface of FIG. 6 or to the description thereof After definition of the breakpoint, the server-side application program code may be compiled and stored as one of applications 135. The stored application 135 is made available for execution by application server 130 via registration and/or other procedures which are known in the art.

Accordingly, the server-side application program code executes at S260 until it is determined that a breakpoint has been reached. Once this determination is made, execution of the program code halts at S265. Next, at S270, debugging information of the first database server session is transmitted to the second user, as illustrated in FIG. 5.

According to some embodiments, the communication between debugging client 102" and application server 130 at S270 uses a JavaScript Object Notation (JSON)-based protocol and a non-transient socket-like connection. For example, client 120" may connect to a debugging tool executing on application server 130 using the open-source Crossfire code and WebSocket, and the debugging tool may transmit debugging information to client 120" via this connection at S270. The debugging information may include information specifying a state of the application executing in the first database server session, memory values, or any other information which may be helpful in debugging the application.

According to some embodiments, multiple debugging sessions from multiple users may attach, simultaneously or not, to a single database server session of the first user for debugging purposes as described above, as long as each user is authorized to debug the single database server session of the first user as described herein. "Simultaneously" in this context indicates that two or more debugging sessions are attached to a first database server session for at least one common period of time.

Figure 7:
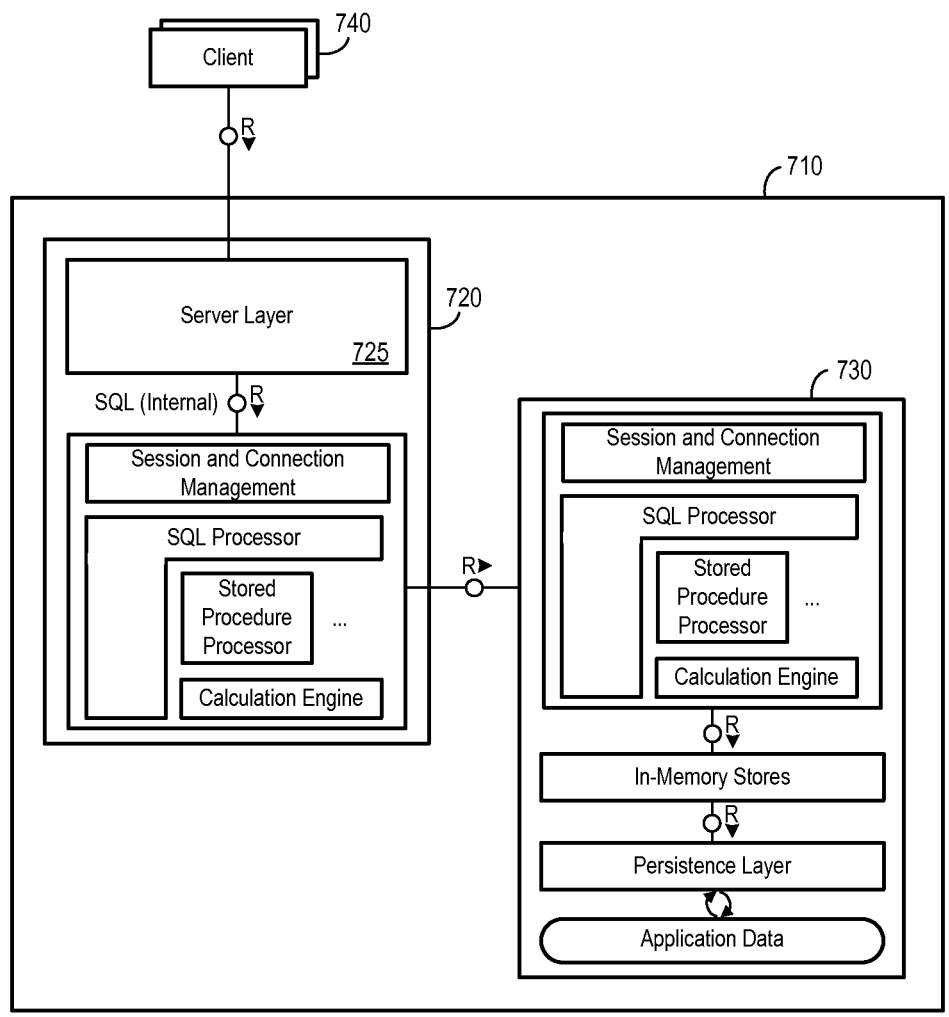
FIG. 7 is a detailed block diagram of an application server according to some embodiments

FIG. 7 illustrates database platform 710 integrating web-based application server 720 and index server 730 according to some embodiments. Application server 720 may enable execution of server applications completely on database platform 710, without the need for an additional application server. In this regard, database platform 710 may comprise an implementation of application server 130 and database system 110 of FIG. 1.

Clients 740 send their requests to database platform 710 via HTTP, which may include requests for WebSocket connections. Clients 740 may be Web browsers, mobile applications, or other applications that consume resources and services provided by server applications. According to some embodiments, the presentation logic is run on clients 740.

Server 720 runs services that accept the HTTP requests and maps them to database queries and stored procedure calls. Data-intensive logic may be executed in index server 730 (using SQL, SQLScript, views, L procedures, C++, etc.).

In this regard, web application server 720 can be viewed as an index server with server layer 725 on top. However, according to some embodiments, no application data is stored in Web application server 720 itself. If server layer 725 needs to access tables or views or needs to call a stored procedure, it uses the illustrated internal SQL API to open a local database connection and then sends an SQL statement to the SQL processor in the web application server 720. The statement is processed by the SQL processor or by the calculation engine of web application server 710.

The SQL processor and the calculation engine delegate the execution to the index server 730 which manages the required data. This delegation may be similar to the mechanism used in a distributed database system including multiple index servers. In contrast, however, web application server 720 delegates the execution of database operations because it does not store application tables. Integration of server 720 into database platform 710 may lead to simplified administration and a better development experience.

Figure 8:
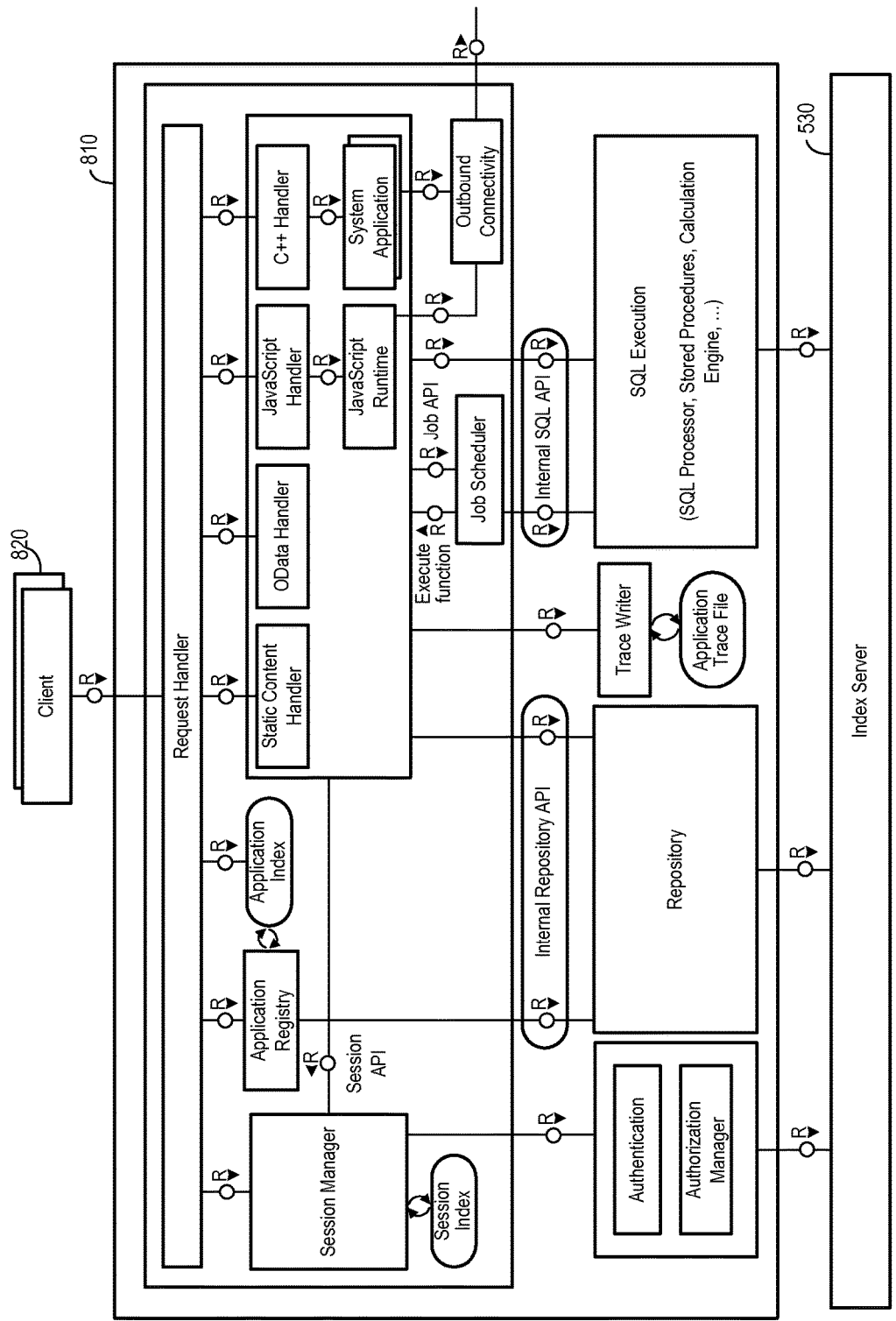
FIG. 8 is a detailed block diagram of an application server according to some embodiments.

FIG. 8 is a detailed block diagram of Web application server 810 according to some embodiments. Server 810 may comprise an implementation of application server 130 of FIG. 1, while index server 830 may comprise an implementation of database system 110.

Incoming requests from clients 820 are received by the request handler. The request handler first determines the server-side application to which the requested resource belongs by invoking the application registry, which maintains a list of all active applications. The application registry initially reads this information from runtime storage tables located in the master index server and caches the information in its application index. After the application is determined, optional Uniform Resource Locator (URL) rewriting rules are applied. URL rewriting rules can be defined for each application to map between external URLs and corresponding internal technical URLs.

The request handler then invokes the session manager. The session manager either relates the request to an existing session or starts a new session. The session manager is responsible for session authentication. A developer may specify, on the package level, whether authentication is required for accessing the resources. Server 810 may support several authentication mechanisms, including but not limited to SAML, SAP assertion ticket, SAP logon ticket, Kerberos, X.509 certificates, and user and password using HTTP basic authentication or form-based logon.

According to some embodiments, the session manager executes S235 and S245 of process 200. In particular, the session manager determines whether the second user is authorized to attach to the first session based on authorization information such as that described with respect to FIGS. 5 and 6. The session manager also links the first and second database server sessions if the authorization is successful.

After successful authentication, the request handler forwards the request to the responsible resource handler of server 810. FIG. 8 illustrates several different resource handlers for different types of resources.

The static content handler is called for content such as Hypertext Markup Language (HTML) files, client side scripts, or images. The static content handler retrieves the resources from the runtime storage.

The OData handler is invoked if the requested resource belongs to an OData service. If the client requests the service definition, the OData handler returns a document including the metadata about the service. This document is generated during the activation of the service descriptor which was written by the developer. If the client requests actual data, the OData handler constructs the required database statements and invokes them using the internal SQL API. The OData handler transforms the query results into the format requested by the client, which can be either Atom (content type "atom+XML") or JSON. As explained above, developers can specify application specific code to be called for validating or executing OData write requests. In this case the OData handler calls the specified code, which may be SQLScript procedures or JavaScript functions.

The JavaScript handler is invoked if the requested resource is a server-side JavaScript application such as those described herein. Embodiments may support server-side applications written in other programming languages. The JavaScript handler reads the runtime object with the JavaScript byte code from the runtime storage tables, and invokes the JavaScript runtime for executing it. The JavaScript runtime also contains an implementation of JavaScript APIs. If such an API is called, the JavaScript runtime invokes the responsible component, such as the session manager, the outbound HTTP client, the trace writer, or the internal SQL API.

The outbound HTTP client is used to send HTTP/S requests to an external server. The connection details of the remote server need to be specified in advance by creating an HTTP destination configuration. The internal SQL API invokes an SQL execution chain. The SQL executor and the calculation engine in server 810 delegate the actual data operations to the index server where the data resides.

The C++ handler is responsible for resources and services exposed by system applications that are written in C++. These system applications have the same lifecycle as the database platform and are part of the database build. One example is a Direct Extractor Connection (DXC) that allows DataSource extractor-based data replication between clients and the database platform via HTTP. DataSource extractors in the client are redirected to send extracted data to the database platform system via HTTP. The data is received by the DXC system application in the XS server, which stores it in the database.

Figure 9:
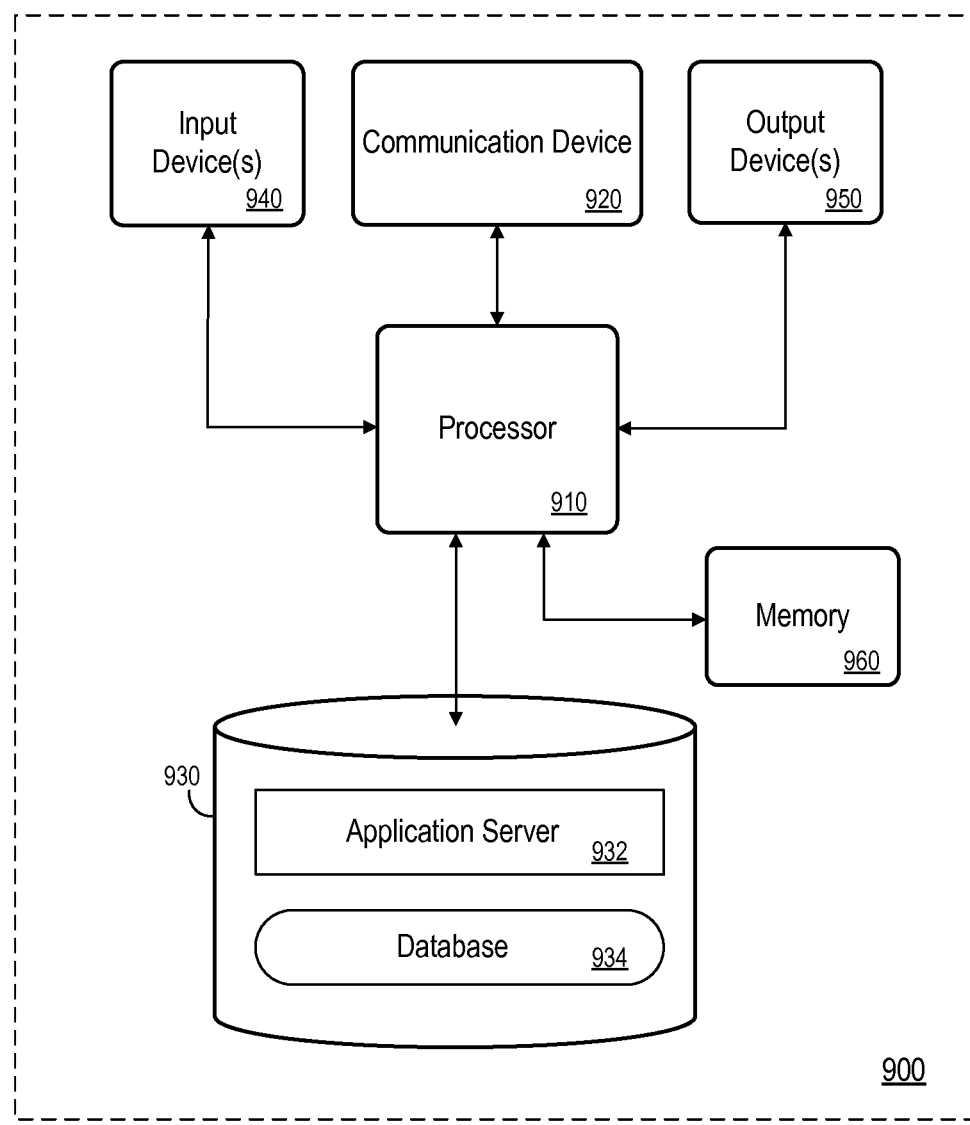
FIG. 9 is a block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of application server 130 and database system 110 of FIG. 1 in some embodiments. Apparatus 900 may include other unshown elements according to some embodiments.

Apparatus 900 includes processor 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Application server 932 may comprise program code executed by processor 910 to cause apparatus 900 to perform any one or more of the processes described herein. Embodiments are not limited to execution of these processes by a single apparatus. Database 934 may include database data as described above. As also described above, database data (either cached or a full database) may be stored in volatile memory such as memory 960. Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising: a memory storing processor-executable process steps; and a processor to execute the processor-executable process steps to cause the system to: receive authorization information associated with one or more database server sessions of a first user, a first database server session of a first user including database server-side application program code in a programming environment, the authorization information associating the first user, a second user, and an authorization period, wherein the authorization information authorizes the second user to debug the first database server session of the first user during the authorization period per the first user, and wherein the authorization period is defined by a start time when the second user is authorized to debug the database server-side application program code and an end time after which the second user is not authorized to debug the database server-side application program code; establish the first database server session of the first user at an application server; establish a second database server session of the second user at the application server; receive, from the second user, a request to debug the first database server session; determine, based on the authorization information, that the second user is authorized to debug the first database server session; in response to the determination, attach the second database server session to the first database server session; and transmit debugging information of the first database server session to the second user;

wherein the authorization information comprises a first token, wherein the processor is further to execute the processor-executable process steps to cause the system to:

receive a request from the first user to establish the first database server session, the request comprising a second token, and wherein determination that the second user is authorized to debug the first database server session comprises determination that the first token is identical to the second token.

2. A system according to claim 1, wherein the processor is further to execute the processor-executable process steps to cause the system to:

store the authorization information in a database as an instance of a database object.

3. A system according to claim 1, wherein the processor is further to execute the processor-executable process steps to cause the system to:

establish a third database server session of a third user;

receive, from the third user, a second request to debug the first database server session;

determine, based on the authorization information, that the third user is authorized to debug the first database server session, wherein the authorization information associates the first user, the third user, and a second authorization period;

in response to the determination that the third user is authorized to debug the first database server session, attach the third database server session to the first database server session; and transmit second debugging information of the first database server session to the third user.

4. A system according to claim 3, wherein the authorization information comprises a first token, wherein the processor is further to execute the processor-executable process steps to cause the system to:

receive a request from the first user to establish the first database server session, the request comprising a second token, wherein determination that the second user is authorized to debug the first database server session comprises determination that the first token is identical to the second token, and wherein determination that the third user is authorized to debug the first database server session comprises determination that the first token is identical to the second token.

5. A system according to claim 4, wherein the third database server session and the second database server session are attached to the first database server session during at least one common time period.

6. A system according to claim 3, attach the third database server session to the first database server session during at least one common time period.

7. A computer-implemented method comprising:

receiving authorization information associated with one or more database server sessions of a first user, a first database server session of a first user including database server-side application program code in a programming environment, the authorization information associating the first user, a second user, an authorization period, and a first token, wherein the authorization information authorizes the second user to debug the first database server session of the first user during the authorization period per the first user, and wherein the authorization period is defined by a start time when the second user is authorized to debug the database server-side application program code and an end time after which the second user is not authorized to debug the database server-side application program code;

receive a request from the first user to establish the first database server session, the request comprising a second token, establishing the first database server session of the first user at an application server;

establishing a second database server session of the second user at the application server;

receiving, from the second user, a request to debug the first database server session;

determining, based on the authorization information, that the second user is authorized to debug the first database server session, the determination comprising a determination that the first token is identical to the second token;

in response to the determination that the second user is authorized to debug the first database server session, attaching the second database server session to the first database server session; and transmitting debugging information of the first database server session to the second user.

8. A computer-implemented method according to claim 7, further comprising:

storing the authorization information in a database as an instance of a database object.

9. A computer-implemented method according to claim 7, further comprising:

establishing a third database server session of a third user;

receiving, from the third user, a second request to debug the first database server session;

determining, based on the authorization information, that the third user is authorized to debug the first database server session, wherein the authorization information associates the first user, the third user, and a second authorization period;

in response to the determination that the third user is authorized to debug the first database server session, attaching the third database server session to the first database server session; and transmitting second debugging information of the first database server session to the third user.

10. A computer-implemented method according to claim 9, wherein determination that the third user is authorized to debug the first database server session comprises determination that the first token is identical to the second token.

11. A computer-implemented method according to claim 10, wherein the third database server session and the second database server session are attached to the first database server session during at least one common time period.

12. A computer-implemented method according to claim 9, attach the third database server session to the first database server session during at least one common time period.

13. A non-transitory computer-readable medium storing program code, the program code executable by a computer system to cause to the computer system to: receive authorization information associated with one or more database server sessions of a first user, a first database server session of a first user including database server-side application program code in a programming environment, the authorization information associating the first user, a second user, and an authorization period, wherein the authorization information authorizes the second user to debug the first database server session of the first user during the authorization period per the first user, and wherein the authorization period is defined by a start time when the second user is authorized to debug the database server-side application program code and an end time after which the second user is not authorized to debug the database-server side application program code; establish the first database server session of the first user at an application server; establish a second database server session of the second user at the application server; receive, from the second user, a request to debug the first database server session; determine, based on the authorization information, that the second user is authorized to debug the first database server session; in response to the determination, attach the second database server session to the first database server session; and transmit debugging information of the first database server session to the second user;

wherein the authorization information comprises a first token, wherein the program code is further executable by the computer system to cause to the computer system to:

receive a request from the first user to establish the first database server session, the request comprising a second token, and wherein determination that the second user is authorized to debug the first database server session comprises determination that the first token is identical to the second token.

14. A medium according to claim 13, wherein the program code is further executable by the computer system to cause to the computer system to:

store the authorization information in a database as an instance of a database object.

15. A medium according to claim 13, wherein the program code is further executable by the computer system to cause to the computer system to:

establish a third database server session of a third user;

receive, from the third user, a second request to debug the first database server session;

determine, based on the authorization information, that the third user is authorized to debug the first database server session, wherein the authorization information associates the first user, the third user, and a second authorization period;

in response to the determination that the third user is authorized to debug the first database server session, attach the third database server session to the first database server session; and transmit second debugging information of the first database server session to the third user.

16. A medium according to claim 15, wherein the authorization information comprises a first token, wherein the program code is further executable by the computer system to cause to the computer system to:

receive a request from the first user to establish the first database server session, the request comprising a second token, wherein determination that the second user is authorized to debug the first database server session comprises determination that the first token is identical to the second token, and wherein determination that the third user is authorized to debug the first database server session comprises determination that the first token is identical to the second token.

17. A medium according to claim 16, wherein the third database server session and the second database server session are attached to the first database server session during at least one common time period.

18. A medium according to claim 15, attach the third database server session to the first database server session during at least one common time period.

* * * * *